(12) United States Patent
Trim et al.

(10) Patent No.: US 11,810,029 B2
(45) Date of Patent: Nov. 7, 2023

(54) PREDICTIVE FORECASTING OF FOOD ALLOCATION

(71) Applicant: International Business Machines Corporation, Armonk, NY (US)

(72) Inventors: Craig M. Trim, Ventura, CA (US); Mary E. Rudden, Denver, CO (US); Sarbajit K. Rakshit, Kolkata (IN); Munish Goyal, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 16/431,283

(22) Filed: Jun. 4, 2019

(65) Prior Publication Data

US 2020/0387761 A1    Dec. 10, 2020

(51) Int. Cl.
*G06Q 10/06* (2023.01)
*G06Q 10/063* (2023.01)
*G06F 17/18* (2006.01)
*G06T 7/00* (2017.01)
*G06N 7/02* (2006.01)
*G06Q 10/04* (2023.01)
*G06Q 10/087* (2023.01)
(Continued)

(52) U.S. Cl.
CPC ........... *G06Q 10/063* (2013.01); *G06F 17/18* (2013.01); *G06F 18/2321* (2023.01); *G06F 18/2415* (2023.01); *G06N 7/02* (2013.01); *G06Q 10/04* (2013.01); *G06Q 10/087* (2013.01); *G06T 7/0002* (2013.01); *G06V 20/52* (2022.01); *G06T 2207/30242* (2013.01)

(58) Field of Classification Search
None
See application file for complete search history.

(56) References Cited

U.S. PATENT DOCUMENTS 9,824,489 B2 * 11/2017 Khormi ................. G06T 17/05
2011/0071877 A1 * 3/2011 Ettl ....................... G06Q 10/087
705/28
(Continued)

FOREIGN PATENT DOCUMENTS

CN        103543703 A      1/2014

OTHER PUBLICATIONS

Ewis, K., "The Internet of Grapes: How IoT and weather come together to support the global food system", Internet of things Blog, Sep. 30, 2016, 14 pages, <https://www.ibm.com/blogs/internet-of-things/iot-food-security/>.

(Continued)

*Primary Examiner* — Arif Ullah
(74) *Attorney, Agent, or Firm* — Edward J. Wixted, III

(57) ABSTRACT

In an approach for predictive forecasting of food allocation, a first data is received from one or more sensors. The amount and condition of available food is determined from the first data. The number and location of people is determined from the first data. The received data is modified to create a second data. One or more food requirements for the people are predicted based on the number and location of people and the second data. An optimal food allocation for the people is predicted based on the amount and condition of food available and the one or more food requirements. The optimal food allocation is reported.

20 Claims, 3 Drawing Sheets

(51) Int. Cl.
  *G06F 18/2415* (2023.01)
  *G06F 18/2321* (2023.01)
  *G06V 20/52* (2022.01)

(56) References Cited

U.S. PATENT DOCUMENTS

| | | | |
|---|---|---|---|
| 2013/0332209 A1 | 12/2013 | Sawada | |
| 2015/0036138 A1 | 2/2015 | Watson | |
| 2017/0116661 A1* | 4/2017 | Sundaram | H04L 67/12 |
| 2017/0262790 A1* | 9/2017 | Khasis | G08G 1/012 |
| 2017/0322682 A1 | 11/2017 | Humayun | |
| 2019/0026791 A1* | 1/2019 | Rai | G06Q 30/0279 |

OTHER PUBLICATIONS

Tianzhong, F., "Implementation of Food Quality Tracking System Based on Internet of Things", Journal of Chemical and Pharmaceutical Research, 2016, 8(4), pp. 436-443.

Afantenos et al., "Using Synchronic and Diachronic Relations for Summarizing Multiple Documents Describing Evolving Events", Cornell University, arXiv:0710.3502, Oct. 18, 2007, 45 pages, <https://arxiv.org/abs/0710.3502>.

Author Unknown, "Vibration Pattern Recognition: EtaPro ViPR", GP Strategies, EtaPRO Performance & Condition Monitoring, https://web.archive.org/web/20190722012718/http://www.etapro.com/platform/vipr.aspx, Accessed Jan. 24, 2023, pp. 1-2.

Barringer, Walter, "How to Use Vibration Analysis to Identify Equipment Problems", Reliable Plant, Printed Nov. 28, 2022, 10 pages, <https://www.reliableplant.com/Read/31055/how-to-use-vibration-analysis-to-identify-equipment-problems>.

Basile et al., "Diachronic Analysis of the Italian Language exploiting Google Ngram", Proceedings of the Third Italian Conference on Computational Linguistics CLiC-it 2016, Dec. 5-6, 2016, Naples, Italy, 6 pages, <https://www.researchgate.net/publication/311740447_Diachronic_Analysis_of_the_Italian_Language_exploiting_Google_Ngram>.

Degaetano-Ortlieb et al., "Information-based Modeling of Diachronic Linguistic Change: from Typicality to Productivity", Proceedings of the 10th SIGHUM Workshop on Language Technology for Cultural Heritage, Social Sciences, and Humanities, Aug. 2016, Berlin, Germany, 9 pages, <http://aclweb.org/anthology/W16-2121>.

Dematteo, Tony, "Phase Analysis: Making Vibration Analysis Easier", Reliable Plant, Printed Nov. 28, 2022, 9 pages, <https://www.reliableplant.com/Read/26843/phase-analysis-vibration>.

Foxworth, Taron, "Using IoT and Machine Learning for Industrial Predictive Maintenance", Losant, Aug. 22, 2017, 3 pages, <https://www.losant.com/blog/using-iot-and-machine-learning-for-industrial-predictive-maintenance>.

Sibert et al., "High speed image correlation for vibration analysis", Journal of Physics: Conference Series vol. 181, 2009, 9 pages, <http://iopscience.iop.org/article/10.1088/1742-6596/181/1/012064/meta>.

* cited by examiner

PREDICTIVE FORECASTING OF FOOD ALLOCATION

BACKGROUND

The present invention relates generally to the field of data processing, and more particularly to optimal food allocation using predictive forecasting.

In the current state of technology, in any given geographic area a range of sensing capabilities and other operational information that systems can treat as indirect sensors may be available. These sensors typically can communicate and interact with other devices over the Internet; hence the term Internet of Things (IoT) is used to describe physical devices and everyday objects that are connected to the Internet. Traditional fields of automation, including control systems, factory automation, and wireless sensor networks, are currently moving to the IoT. In the consumer space the concept of the "smart home" has devices, for example security cameras, and appliances, for example refrigerators, connected to the IoT, allowing for remote data collection from these homes.

Common IoT sensors include those that monitor temperature, humidity, moisture, occupancy, motion, gas, water level, sound, and vibration. As more and more cases of food recalls are being traced to contamination, IoT devices are becoming common in the food supply chain. From the basic temperature sensors to more sophisticated sensors that detect pathogens and determine bacteria count, IoT sensors are rapidly becoming commonplace in the food supply chain.

SUMMARY

Embodiments of the present invention disclose a method, a computer program product, and a system for predictive forecasting of food allocation. In one embodiment, a first data is received from one or more sensors. The amount and condition of available food is determined from the first data. The number and location of people is determined from the first data. The received data is modified to create a second data. One or more food requirements for the people are predicted based on the number and location of people and the second data. An optimal food allocation for the people is predicted based on the amount and condition of food available and the one or more food requirements. The optimal food allocation is reported.

DETAILED DESCRIPTION

Food items are constantly spoiled in disaster areas. Floods, storms and high winds can encroach upon supplies. Exposure to the elements causes loss and disruption. The scarcity of food in impacted regions is an all too common threat. Households and shops may store inventory for several days or weeks depending on their purchase cycle, including tendencies to buy in bulk or in smaller amounts. Urban, semi-urban and rural environments are at risk. Disaster relief often depends on the dynamic creation of a supply chain where none previously existed. The logistics are intense and complicated, and predictive analytics are required to forecast where essential items are most likely to be found. In a disaster-impacted region, food shortage is a scenario that must be solved quickly.

Embodiments of the present invention recognize that improvements can be made to disaster food allocation management. Implementation of embodiments will gather data from various sensors in the affected area. During a natural disaster, these sensors will identify a variety of issues regarding conditions such as location and condition of food, weather, transportation capabilities, as well as documenting the number and condition of people in the affected area. Information from these sensors will be compiled and analyzed to determine the available food resources and the optimal allocation of those resources to the people in the affected area. Various analysis techniques can be applied to the data to determine the optimal allocation of available food resources. Implementation of embodiments of the invention may take a variety of forms, and exemplary implementation details are discussed subsequently with reference to the Figures.

As referred to herein, all data retrieved, collected, and used, is used in an opt in manner, i.e., the data provider has given permission for the data to be used. For example, the installation procedure for an IoT device that would be used to collect data could include an option that must be selected by the owner to allow use of the data. As another example, forecasting program 162 could request approval from the owner of the device before collecting the data. Any data or information used for which the provider has not opted in is data that is publicly available.

Figure 1:
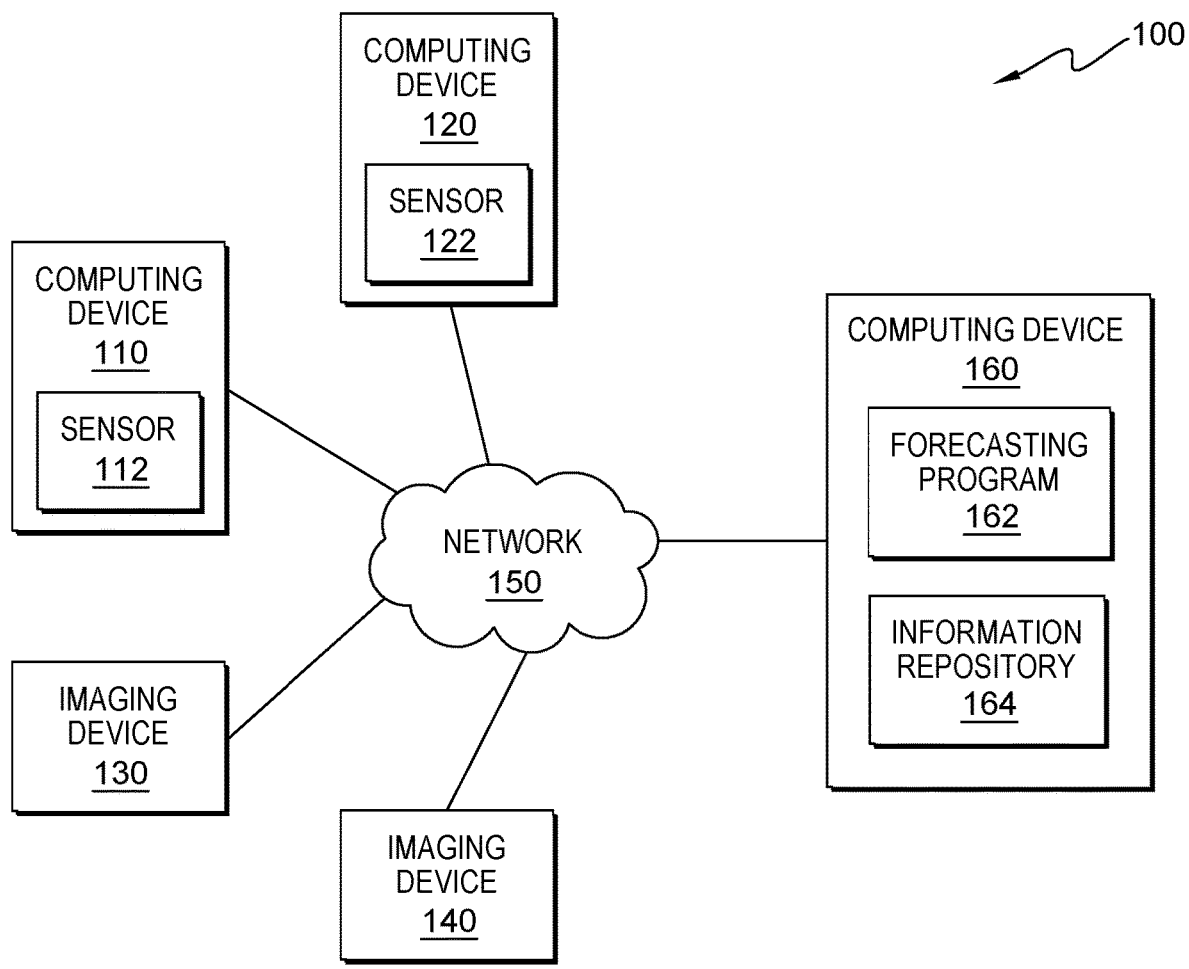
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of forecasting program 162 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, computing device 120, imaging device 130, imaging device 140, and computing device 160, all interconnected over network 150. Network 150 can be, for example, a telecommunications network, a local area network (LAN), a wide area network (WAN), such as the Internet, or a combination of the three, and can include wired, wireless, or fiber optic connections. Network 150 can include one or more wired and/or wireless networks that are capable of receiving and transmitting data, voice, and/or video signals, including multimedia signals that include voice, data, and video information. In general, network 150 can be any combination of connections and protocols that will support communications between computing device 110, computing device 120, imaging device 130, imaging device 140, computing device 160, and other computing devices (not shown) within distributed data processing environment 100.

Computing device 110 and computing device 120 each represent one or more computing devices with which computing device 160 communicates, via network 150. Imaging device 130 and imaging device 140 each represent one or more imaging devices with which computing device 160 communicates, via network 150. Computing device 160 represents a remote computing device, for example a remote server, that gathers data from computing device 110, computing device 120, imaging device 130, and imaging device 140. In general, computing device 110, computing device 120, imaging device 130, imaging device 140, and computing device 160 each represent any programmable electronic device or combination of programmable electronic devices capable of executing machine readable program instructions and communicating with other computing devices (not shown) within distributed data processing environment 100 via a network, such as network 150.

Computing device 110 and computing device 120 can each be a laptop computer, a tablet computer, a smart phone, an IoT device, or any programmable electronic device capable of communicating with various components and devices within distributed data processing environment 100, via network 150. In various embodiments computing device 110 and computing device 120 include sensors 112 and 122, respectively. Sensors 112 and 122 may determine, for example, the air temperature, temperature of the food item directly, relative humidity, or the moisture content of the food item. In various embodiments many different parameters may be determined from sensors 112 and 122 that can be used to determine the availability and condition of food within the affected area.

In one embodiment, computing device 110 with sensor 112 or computing device 120 with sensor 122 may be in the form of an IoT sensor located in a food store to monitor the condition of the food. Condition of the food may be determined, for example, by measuring the temperature and humidity of the food over time, and comparing those measurements to standards from the U.S. Department of Agriculture or other known reliable sources. In another embodiment, sensors 112 or 122 may measure gas emissions from the food item that may indicate spoilage. In yet another embodiment, data from sensors 112 or 122 may detect that the store is flooded, rendering the food likely spoiled and unusable. As the use of IoT sensors increase in the food supply industry, more data will become available from the IoT sensors in the food store, and this data may be used in various embodiments.

In an embodiment of the invention, computing device 120 is substantially similar to computing device 110. In an embodiment, computing device 120 may be in a similar location to computing device 110. In an alternative embodiment, computing device 120 may be in a different location to computing device 110. In an embodiment, distributed data processing environment 100 may include any number of computing device 110.

Imaging device 130 and imaging device 140 can each be a laptop computer with an incorporated camera, a tablet computer with an incorporated camera, a smart phone with an incorporated camera, an Internet of Things (IoT) device with an incorporated camera, or any programmable electronic device capable of capturing images or video and communicating with various components and devices within distributed data processing environment 100, via network 150. In one embodiment, imaging device 130 or imaging device 140 may be a web cam in a store or a home. In another embodiment imaging device 130 or imaging device 140 may be a drone capturing images or videos of the affected area. In yet another embodiment, imaging device 130 or imaging device 140 may be a traffic camera within the affected area. In general, imaging device 130 and imaging device 140 each represent any programmable electronic device or combination of programmable electronic devices capable of capturing images or video and communicating with other computing devices (not shown) within distributed data processing environment 100 via a network, such as network 150.

In an embodiment of the invention, imaging device 140 is substantially similar to imaging device 130. In an embodiment, imaging device 140 may be in a similar location to imaging device 130. In an alternative embodiment, imaging device 140 may be in a different location to imaging device 130. In an embodiment, distributed data processing environment 100 may include any number of imaging device 130.

Computing device 160 can be a standalone computing device, a management server, a web server, a mobile computing device, or any other electronic device or computing system capable of receiving, sending, and processing data. In other embodiments, computing device 160 can represent a server computing system utilizing multiple computers as a server system, such as in a cloud computing environment. In another embodiment, computing device 160 can be a laptop computer, a tablet computer, a netbook computer, a personal computer (PC), a desktop computer, a personal digital assistant (PDA), a smart phone, or any programmable electronic device capable of communicating with computing device 110, computing device 120, imaging device 130, imaging device 140, and other computing devices (not shown) within distributed data processing environment 100 via network 150. In another embodiment, computing device 160 represents a computing system utilizing clustered computers and components (e.g., database server computers, application server computers, etc.) that act as a single pool of seamless resources when accessed within distributed data processing environment 100.

In an embodiment, computing device 160 includes forecasting program 162. In an embodiment, forecasting program 162 is a program, application, or subprogram of a larger program for predictive forecasting of food allocation. In an alternative embodiment, forecasting program 162 may be located on any other device accessible by computing device 160 via network 150.

In an embodiment, computing device 160 includes information repository 164. In an embodiment, information repository 164 may be managed by forecasting program 162. In an alternative embodiment, information repository 164 may be managed by the operating system of the device, alone, or together with, forecasting program 162. In some embodiments, information repository 164 is located externally to computing device 160 and accessed through a communication network, such as network 150. In some embodiments, information repository 164 is stored on computing device 160. In some embodiments, information repository 164 may reside on another computing device (not shown), provided that information repository 164 is accessible by computing device 160. Information repository 164 includes, but is not limited to, sensor data, environmental data, images, and videos that are received by forecasting program 162 from one or more sources, and data that is created by forecasting program 162.

Information repository 164 may be implemented using any volatile or non-volatile storage media for storing information, as known in the art. For example, information repository 164 may be implemented with a tape library, optical library, one or more independent hard disk drives, multiple hard disk drives in a redundant array of independent disks (RAID), solid-state drives (SSD), or random-access memory (RAM). Similarly, information repository 164 may be implemented with any suitable storage architecture known in the art, such as a relational database, an object-oriented database, or one or more tables.

Figure 2:
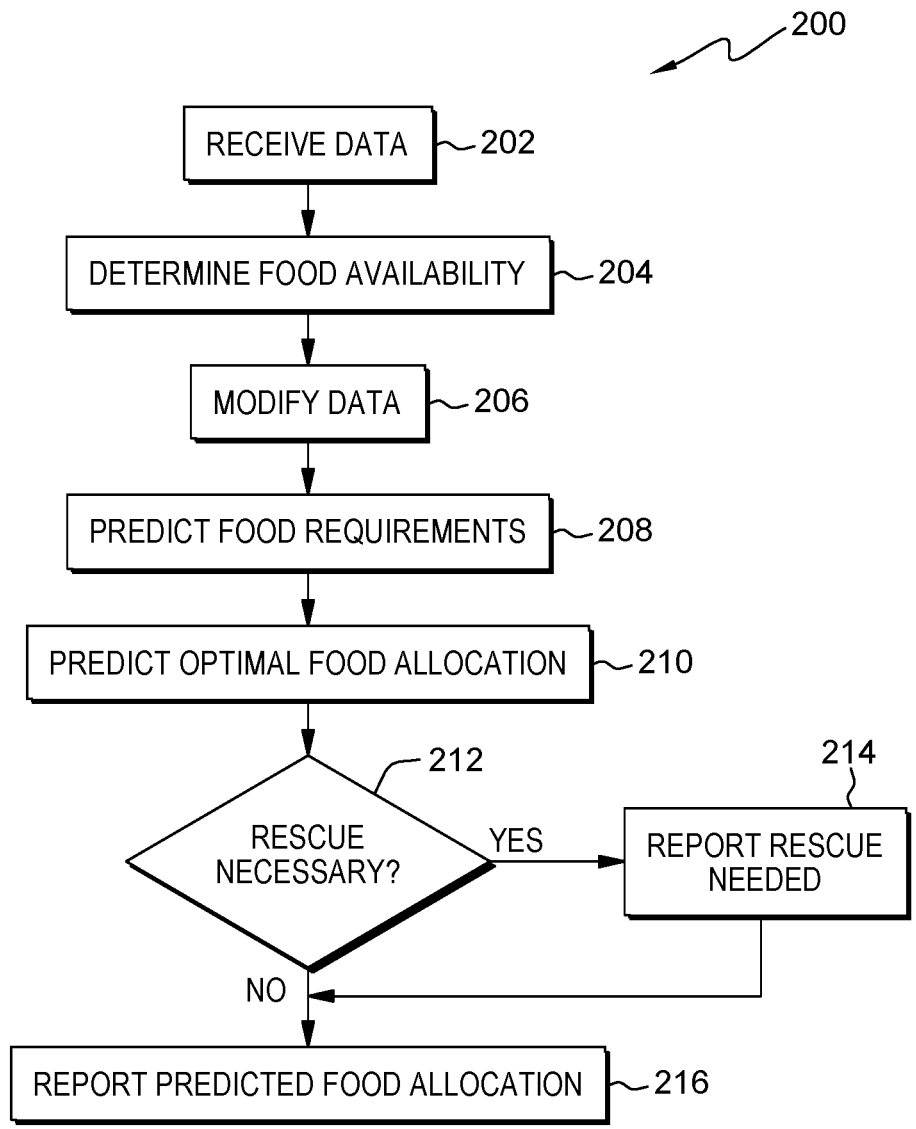
FIG. 2 is a flowchart depicting operational steps of the forecasting program, on a remote computing device within the distributed data processing environment of FIG. 1, for food resource allocation, in accordance with an embodiment of the present invention.

FIG. 2 is a flow chart diagram of workflow 200 depicting operational steps for forecasting program 162 in accordance with at least one embodiment of the invention. In an alternative embodiment, the steps of workflow 200 may be performed by any other program while working with forecasting program 162. It should be appreciated that embodiments of the present invention provide at least for collecting data, images, and videos from computing device 110, computing device 120, imaging device 130, and imaging device 140, and determining the optimum allocation of food resources on computing device 160. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

In an embodiment, forecasting program 162 may receive data, images, or videos from any number of devices capable of communicating over network 150. In an embodiment, forecasting program 162 may use the received data to determine the availability of food and the number and location of people within the affected area. In an embodiment, forecasting program 162 may modify the received data using mathematical algorithms. In an embodiment, forecasting program 162 may use the modified data to predict the food requirements of the people in the affected area. In an embodiment, forecasting program 162 may use the determination of available food and the prediction of the food requirements to predict the optimum food allocation. In an embodiment, forecasting program 162 may analyze the modified data to determine if people are in need of rescue. In an embodiment, forecasting program 162 may report that people are in need of rescue. In an embodiment, forecasting program 162 may report the predicted allocation of food.

Forecasting program 162 receives data (step 202). At step 202, forecasting program 162 receives data from one or more sources. In an embodiment, the one or more sources include computing device 110, computing device 120, imaging device 130, imaging device 140, or any combination thereof. In another embodiment, the one or more sources may include any number of computing devices or imaging devices capable of communicating with computing device 160 over network 150. In an embodiment, the one or more sources may be chosen by forecasting program 162 from a database of available sources when a disaster area is determined. For example, forecasting program 162 may use video feeds to determine the extent of the area affected, and then choose the one or more sources based on this determination. In another embodiment, forecasting program 162 may receive a list of the one or more sources from the user of the system. In yet another embodiment, forecasting program 162 may determine a list of sources to use based on a prediction from, for example, the National Oceanic and Atmospheric Administration (NOAA), of the area likely to be affected by an upcoming weather event.

In an embodiment, data is collected by the one or more sources and received by forecasting program 162 in order to determine the optimal allocation of available food. In an embodiment, forecasting program 162 is executed in response to the occurrence of a disaster, such as a flood or earthquake. In another embodiment, forecasting program 162 may be continuously executing to gather data to be used in the event that a disaster occurs, for example, a flood or an earthquake.

In an embodiment, the data received from the one or more sources may include sensor data from food stores. For example, the data may include feeds from gas sensors placed on perishable food items in a food store, where the data from the gas sensors can be used to determine if the food is still edible. In an embodiment, the data received from the one or more sources may be video feeds from food stores. For example, the data may include live or recorded video streams from a food store that can be used to determine if the store has been flooded; if the store has electric power; the amount of food available in the store; and/or whether people can get into the store. In some embodiments, the data received from the one or more sources may include data received from smart homes. For example, data received from smart homes may include the type and quantity of food items stored in the home, the number and condition of people in the home, and the ability to cook food in the home. In some embodiments, the data from the one or more sources may include, for example, aerial data from drones or other sources, traffic camera feeds, journalist reports, and other available data. Forecasting program 162 may use this data to determine the extent of the disaster, the likely availability of transportation, the likely need for rescue, etc.

In some embodiments, the data from the one or more sources may be from different locations. For example, computing device 110 located in a food store at location A may transmit IoT sensor data to forecasting program 162, imaging device 130 located in a smart home at location B may transmit one or more still images to forecasting program 162, computing device 120 located in a hotel at location C may transmit occupancy data to forecasting program 162, and imaging device 140, a traffic camera located at street intersection D, may transmit a video stream to forecasting program 162.

In some embodiments, the data from the one or more sources may be from multiple devices, but the locations of the devices may be the same. For example, computing device 110 located at food store A may transmit IoT sensor data from sensors on perishable food to forecasting program 162; imaging device 130 at smart home B may transmit one or more still images to forecasting program 162 that help determine occupancy; computing device 120 also at smart home B may be a smart refrigerator that transmits amount of available food to forecasting program 162; and imaging device 140 may be a traffic camera at main intersection C that transmits a video stream to forecasting program 162 to determine road conditions.

In an embodiment, the data received from the one or more sources includes attached metadata that indicates which location and/or device the data is being transferred from. In an embodiment, the metadata may also include timestamp information about the data, type of compression for video data, or any other type of information used to describe the contents of the data. As used herein, the term data includes any metadata that may be attached to the data.

Forecasting program 162 determines food availability (step 204). Forecasting program 162 determines food availability from the data received in step 202. In an embodiment, forecasting program 162 will use the data received in step 202 to determine the amount, type, and condition of food available for allocation. In an embodiment, forecasting program 162 will use the data received in step 202 to determine the number of people in need of food allocation. In an embodiment, forecasting program 162 will geolocate the amount and type of food. In an embodiment, forecasting program 162 will geolocate the people in need of food allocation. In an embodiment, forecasting program 162 may use blockchain technology to track the availability of food in individual stores or homes. In an embodiment, forecasting program 162 will determine whether the food available at a location can be consumed without cooking. If forecasting program 162 determines that the available food cannot be consumed without cooking, then forecasting program 162 will determine if a means of cooking is available. For example, forecasting program 162 may determine that a location has a store of rice, but there is no electricity available, and therefore no means to cook the rice, so forecasting program 162 will determine that there is no consumable food available for people at that location.

Forecasting program 162 modifies data (step 206). At step 206, forecasting program 162 modifies the data it received from the one or more sources in step 202 to create a second data. Since a disaster is rarely a repeat event, historical data relevant to the disaster is typically lacking. Therefore, in an embodiment, forecasting program 162 will use the Fuzzy Time Series (FTS) method to predict the optimum allocation of available food resources given little or no historical data related to the disaster. FTS uses Fuzzy Logic and Fuzzy Sets combined with Time Series to predict future results when historical data is lacking. Fuzzy sets incorporate uncertainty into traditional set theory in a process called fuzzification. For example, in traditional analysis, a person would either be a member of the set of people who need food or would be a member of the set of people who do not need food. But using fuzzy logic, an element can be in both sets, i.e., a person may be in both the set of people who need food and the set of people who do not need food. In addition, the membership in each set can be weighted with a value between 0 and 1; for example, a person can be a member in the set of people who need food with a value of 0.2, and a member in the set of people who do not need food with a value of 0.8. Fuzzy logic does not restrict a person to just 2 sets, but a person may be a member of any number of sets.

Time series adds a time component to the data set, allowing for a series that can be used to predict future values. A time series is a sequence of observations taken sequentially in time. In an embodiment, forecasting program 162 will use fuzzification and time series to create a data set based on historical data from the affected area during normal conditions. In another embodiment, forecasting program 162 will use fuzzification and time series to create a data set based on historical data gathered during a prior natural disaster in a different geographical area. In yet another embodiment, forecasting program 162 will use fuzzification and time series to create a data set based on historical data from both the affected area during normal conditions and from a prior natural disaster in a different geographical area.

In an embodiment, the fuzzy time series data set created forecasting program 162 will be used to predict the rate of consumption of food. Forecasting program 162 will determine relationships for the data received in step 202 by extrapolating the FTS data set, using Equation 1, shown below.

$$A_{ij}, A_{i(j-1)}, \ldots, A_{i1} \rightarrow A_{j1} \quad \text{(Equation 1)}.$$

Here, $A_{j1}$ is the prediction based on the FTS data set. In an embodiment, forecasting program 162 will create the FTS data set that will be used to predict the optimum food allocation.

Forecasting program 162 predicts food requirements (step 208). Forecasting program 162 determines food requirements based on the number and location of people and the modified data from step 206. In an embodiment, forecasting program 162 will analyze the number and location of people and the modified data from step 206 to predict the food requirements for people in the affected area. In an embodiment, forecasting program 162 will use the Fuzzy Time Series data set created in step 206 to predict the rate of consumption of food in the affected area. In an embodiment, this prediction will be based on historical data from the affected area in normal times. In another embodiment, this prediction will be based on historical data from prior disasters in other geographic locations. In yet another embodiment, this prediction will be based on historical data from both the affected area in normal times and prior disasters in other geographic locations.

In an embodiment, forecasting program 162 will geolocate the people in the affected area to predict the amount of food required at each location. In an embodiment, forecasting program 162 will determine the ability to cook food by analyzing the received data from step 202 and the modified data from step 206. In an embodiment, forecasting program will use one or more of the results of this analysis to predict the locations where food must be allocated that can be consumed without cooking. In an embodiment, forecasting program 162 will use the received data from step 202 and the modified data from step 206 to predict appropriate food for people with special dietary needs. For example, if forecasting program 162 determines that there are infants at one or more locations within the affected area, then forecasting program 162 will allocate appropriate food, such as baby formula, to that location. In an embodiment, forecasting program 162 will analyze conditions to determine the availability of transportation within the affected area in relation to the location of people in need of food. Forecasting program will use the determination of availability of transportation to predict which people may be able to travel to acquire food without assistance.

Forecasting program 162 predicts optimum food allocation (step 210). Forecasting program 162 predicts the optimum food allocation based on the food availability determined in step 204 and the food requirements predicted in step 208. In an embodiment, forecasting program 162, based on the amount of food available, availability of transportation, and priority status of certain locations, will prioritize the allocation of the available food resources. Based on the population distribution and predicted rate of food consumption from step 208, forecasting program 162 will predict the amount of food required for each location. In an embodiment, forecasting program 162 will analyze conditions to determine the availability of transportation within the affected area in relation to the location of people in need of food to predict the optimum method to allocate food to those people. For example, forecasting program 162 may analyze the aerial data from drones, camera feeds, journalist reports, and sensor data and predict that due to flooded roads drones may be the best method to deliver food to certain locations.

Forecasting program 162 determines whether rescue is necessary (decision step 212). At decision step 212, forecasting program 162 analyzes the amount and condition of food available from step 204 and the prediction of food requirements from step 208 to determine the probability that a group of one or more people are in need of rescue. In an embodiment, forecasting program 162 compares the amount and condition of food available from step 204, the food requirements from step 208, and the availability of transportation from the modified data from step 206, to determine the probability that people in the affected area need rescue due to lack of food. In an embodiment, forecasting program 162 may set a value between 0 and 1 (0% to 100%) for the probability, where the higher the value, the greater the likelihood that people are in need of rescue. For example, based on the number of people, the amount of food, and the transportation conditions in an area, forecasting program 162 may determine that the people in that area will run out of food in two days, but that it will not be possible to acquire more food for at least five days. Therefore, forecasting program 162 will predict that there is a high probability that people in that area are in need of rescue, and will assign a high value to the probability (for example, 70%). In another example, forecasting program 162 may predict that, although there is a lack of available transportation in a specific area, the people in that area have sufficient food, and transportation is expected to be restored before the available food supply is predicted to be exhausted. Therefore, forecasting program 162 may predict that there is a low probability that people in that area are in need of rescue, and assign a low value to the probability (for example, 10%).

In an embodiment, forecasting program 162 may use a threshold established by the user to determine when rescue is necessary. For example, a user may set a threshold of a 50% probability that people will run out of food before conditions will allow them to obtain more food to report people are in need of rescue. In this example, if forecasting program determines that the probability that people will run out of food is greater than 50%, then forecasting program 162 will determine that rescue is required. In another embodiment, forecasting program 162 may use historical data from other disasters to determine the threshold. If forecasting program 162 predicts that the likelihood that people will run out of food before conditions will allow them to obtain more food exceeds this threshold, then forecasting program 162 will determine people are in need of rescue.

Forecasting program 162 reports the need for rescue (step 214). If forecasting program 162 determines that the probability that people in the affected area are in need of rescue exceeds a preset threshold (decision step 212, "Yes" branch), then forecasting program 162 reports the need for rescue determined in step 212. In an embodiment, forecasting program 162 reports the predicted need for rescue as demographic data. In an embodiment, forecasting program 162 overlays the demographic data on a map of the affected area. For example, forecasting program may generate an overlay map of the affected area displaying areas highlighted in red where people should be rescued first, areas highlighted in yellow where people should be rescued next, and areas highlighted in green where rescue is likely not needed.

In another embodiment, forecasting program 162 reports the predicted need for rescue as a report of the food availability determined in step 204 versus the rate of food consumption from step 208. This report, for example, may list the location of people in the affected area sorted by the predicted time people in that area will run out of food. Authorities could use this report to prioritize rescue.

Forecasting program 162 reports predicted food allocation (step 216). If forecasting program 162 determines the probability that people are in need of rescue is low (decision step 212, "No" branch), or if forecasting program 162 determines the probability that people are in need of rescue is high and the need for rescue report has been sent, then forecasting program 162 reports the predicted allocation of food based on the prediction in step 214. In an embodiment, forecasting program 162 may use blockchain technology to ensure the food is allocated as predicted. In an embodiment, forecasting program 162 reports the predicted food allocation as demographic data. In an embodiment, forecasting program 162 overlays the food allocation demographic data on a map of the affected area. For example, forecasting program 162 may generate an overlay map of the affected area displaying areas where people that are located with little or no food and no means of transportation are highlighted in red; areas where people are located with some food and no means of transportation are highlighted in orange; areas where people are located with some food but transportation is likely to be restored before all the available food is consumed are highlighted in yellow; and areas where people are located with sufficient food or available means of transportation are highlighted in green.

In another embodiment, forecasting program 162 overlays the location of food stores on a map of the affected area, with the predicted time the food will last. For example, forecasting program 162 may generate an overlay map of the affected area displaying the available food stores, with a notation of the predicted time that food in each area will last before it is consumed or spoiled.

In other embodiments, forecasting program 162 may generate any report based on the determination of food availability from step 204, the prediction of food requirements from step 208, and the prediction of optimal food allocation from step 210, that may be useful during a natural disaster.

Figure 3:
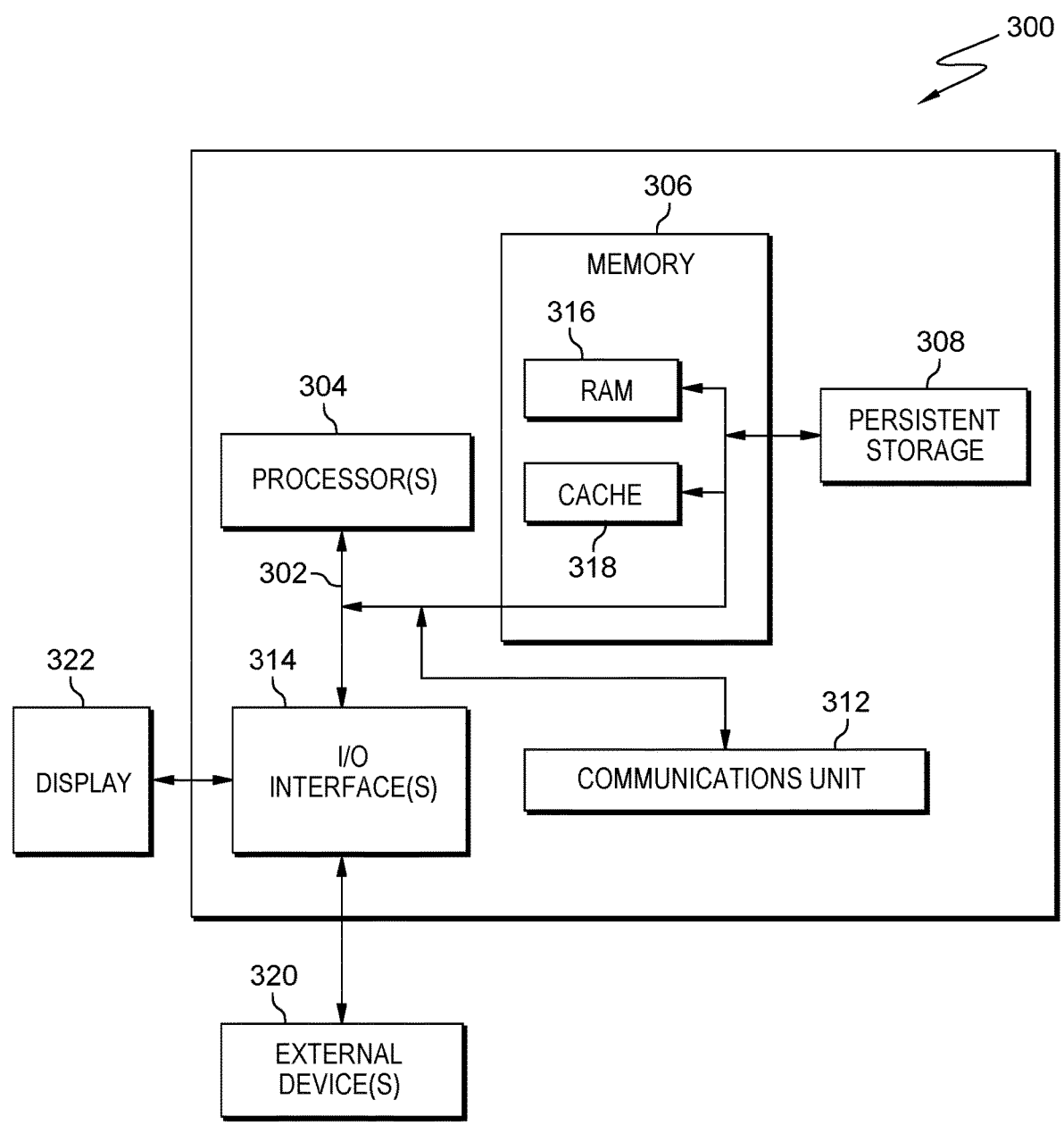
FIG. 3 depicts a block diagram of components of the computing devices executing the forecasting program within the distributed data processing environment of FIG. 1, in accordance with an embodiment of the present invention.

FIG. 3 depicts a block diagram of components of computing device 160 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing device 160 can include processor(s) 304, cache 318, memory 306, persistent storage 308, communications unit 312, input/output (I/O) interface(s) 314 and communications fabric 302. Communications fabric 302 provides communications between cache 318, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 318 is a fast memory that enhances the performance of processor(s) 304 by holding recently accessed data, and data near recently accessed data, from memory 306.

Program instructions and data used to practice embodiments of the present invention, e.g., forecasting program 162, data from computing devices 110 and 120, and data from imaging devices 130 and 140, are stored in persistent storage 308 of computing device 160 for execution and/or access by one or more of the respective processor(s) 304 of computing device 160 via memory 306. In one embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. Forecasting program 162, data from computing devices 110 and 120, and data from imaging devices 130 and 140 may be downloaded to persistent storage 308 of computing device 160 through communications unit 312.

I/O interface(s) 314 allows for input and output of data with other devices that may be connected to computing device 110, computing device 120, imaging device 130, and imaging device 140. For example, I/O interface(s) 314 may provide a connection to external device(s) 320 such as a keyboard, a keypad, a touch screen, a microphone, a digital camera, and/or some other suitable input device. External device(s) 320 can also include portable computer readable storage media such as, for example, thumb drives, portable optical or magnetic disks, and memory cards. Software and data used to practice embodiments of the present invention, e.g., forecasting program 162, computing devices 110 and 120, and imaging devices 130 and 140, can be stored on such portable computer readable storage media and can be loaded onto persistent storage 308 via I/O interface(s) 314. I/O interface(s) 314 also connect to a display 322. Software and data used to practice embodiments of the present invention, e.g., forecasting program 162, computing devices 110 and 120, and imaging devices 130 and 140, can be stored on such portable computer readable storage media and can be loaded onto persistent storage 308 via I/O interface(s) 314.

Display 322 provides a mechanism to display data to a user and may be, for example, a computer monitor. Display 322 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more computer processors, first data compiled remotely from a plurality of Internet of Things (IoT) sensors located at multiple disparate food store locations throughout a geographic area, wherein the plurality of IoT sensors:
     collects data comprising food item temperature, relative humidity, food item moisture content; and
     includes a gas sensor that collects data including food item gas emissions;
   determining, by one or more computer processors, an amount and condition of food available throughout the geographic area based on the first data, wherein the condition of the food is determined based on, at least, food item gas emission data;
   determining, by one or more computer processors, a number and location of people throughout the geographic area based on the first data;
   modifying, by one or more computer processors, the first data to create second data;
   predicting, by one or more computer processors, one or more food requirements for the people based on the number and location of people and the second data;
   predicting, by one or more computer processors, an optimal food allocation for the people based on the amount and condition of food available and the one or more food requirements;
   reporting, by one or more computer processors, the optimal food allocation;
   determining, by one or more computer processors, a probability that one or more people of the people will run out of food based on the amount and condition of food available and the one or more food requirements; and
   responsive to the probability of any of the one or more people being greater than a threshold, reporting, by one or more computer processors, a first group of people of the one or more people, wherein the first group of people have the probability greater than the threshold.

2. The computer-implemented method of claim 1, wherein the first data is modified by applying fuzzification to create the second data.

3. The computer-implemented method of claim 1, wherein the first data is modified by applying time series to create the second data.

4. The computer-implemented method of claim 1, wherein the first data is modified by applying fuzzification and time series to create the second data.

5. The computer-implemented method of claim 1, further comprising overlaying, by one or more computer processors, the optimal food allocation on a map of an affected area.

6. The computer-implemented method of claim 1, further comprising:
   responsive to the probability of any of the one or more people being greater than the threshold, overlaying, by one or more computer processors, the first group of people on a map of an affected area.

7. A computer program product comprising:
   one or more computer readable storage media and program instructions collectively stored on the one or more computer readable storage media, the program instructions comprising:
   program instructions to receive first data compiled remotely from a plurality of Internet of Things (IoT)

sensors located at multiple disparate food store locations throughout a geographic area, wherein the plurality of IoT sensors:
  collects data comprising food item temperature, relative humidity, food item moisture content; and
  includes a gas sensor that collects data including food item gas emissions;
program instructions to determine an amount and condition of food available throughout the geographic area based on the first data, wherein the condition of the food is determined based on, at least, food item gas emission data;
program instructions to determine a number and location of people throughout the geographic area based on the first data;
program instructions to modify the first data to create second data;
program instructions to predict one or more food requirements for the people based on the number and location of people and the second data;
program instructions to predict an optimal food allocation for the people based on the amount and condition of food available and the one or more food requirements;
program instructions to report the optimal food allocation;
program instructions to determine a probability that one or more people of the people will run out of food based on the amount and condition of food available and the one or more food requirements; and
program instructions to, responsive to the probability of any of the one or more people being greater than a threshold, report a first group of people of the one or more people, wherein the first group of people have the probability greater than the threshold.

8. The computer program product of claim 7, further comprising program instructions, stored on the one or more computer readable storage media, to modify the first data by applying fuzzification to create the second data.

9. The computer program product of claim 7, further comprising program instructions, stored on the one or more computer readable storage media, to modify the first data by applying time series to create the second data.

10. The computer program product of claim 7, further comprising program instructions, stored on the one or more computer readable storage media, to modify the first data by applying fuzzification and time series to create the second data.

11. The computer program product of claim 7, further comprising program instructions, stored on the one or more computer readable storage media, to overlay the optimal food allocation on a map of an affected area.

12. The computer program product of claim 7, further comprising program instructions, stored on the one or more computer readable storage media, to:
  responsive to the probability of any of the one or more people being greater than the threshold, overlay the first group of people on a map of an affected area.

13. A computer system comprising:
one or more computer processors;
one or more computer readable storage media;
program instructions stored on the one or more computer readable storage media for execution by at least one of one or more computer processors, the stored program instructions comprising:
program instructions to receive first data compiled remotely from a plurality of Internet of Things (IoT) sensors located at multiple disparate food store locations throughout a geographic area, wherein the plurality of IoT sensors:
  collects data comprising food item temperature, relative humidity, food item moisture content; and
  includes a gas sensor that collects data including food item gas emissions;
program instructions to determine an amount and condition of food available throughout the geographic area based on the first data, wherein the condition of the food is determined based on, at least, food item gas emission data;
program instructions to determine a number and location of people throughout the geographic area based on the first data;
program instructions to modify the first data to create second data;
program instructions to predict one or more food requirements for the people based on the number and location of people and the second data;
program instructions to predict an optimal food allocation for the people based on the amount and condition of food available and the one or more food requirements;
program instructions to report the optimal food allocation;
program instructions to determine a probability that one or more people of the people will run out of food based on the amount and condition of food available and the one or more food requirements; and
program instructions to, responsive to the probability of any of the one or more people being greater than a threshold, report a first group of people of the one or more people, wherein the first group of people have the probability greater than the threshold.

14. The computer system of claim 13, further comprising program instructions, stored on the one or more computer readable storage media for execution by at least one of the one or more computer processors, to modify the first data by applying fuzzification to create the second data.

15. The computer system of claim 13, further comprising program instructions, stored on the one or more computer readable storage media for execution by at least one of the one or more computer processors, to modify the first data by applying time series to create the second data.

16. The computer system of claim 13, further comprising program instructions, stored on the one or more computer readable storage media for execution by at least one of the one or more computer processors, to modify the first data by applying fuzzification and time series to create the second data.

17. The computer system of claim 13, further comprising program instructions, stored on the one or more computer readable storage media for execution by at least one of the one or more computer processors, to overlay the optimal food allocation on a map of an affected area.

18. The computer-implemented method of claim 1, wherein the plurality of Internet of Things (IoT) sensors collect data of a type further comprising air temperature.

19. The computer-implemented method of claim 1, further comprising:
receiving, by one or more computer processors, video feed of the geographic area;
determining, by one or more computer processors, that the geographic area comprises a disaster area based on the video feed; and
wherein receiving the first data is in response to determining that the geographic area comprises the disaster area based on the video feed.

20. The computer-implemented method of claim 1, further comprising:
   determining, by one or more computer processors, that food in the food store is edible based on the gas sensor.

* * * * *